(12) United States Patent
Chang et al.

(10) Patent No.: US 7,879,498 B2
(45) Date of Patent: Feb. 1, 2011

(54) CENTER PIN AND LITHIUM ION SECONDARY BATTERY USING THE SAME

(75) Inventors: Seok-Gyun Chang, Yongin-si (KR); Yoo-Eup Hyung, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 777 days.

(21) Appl. No.: 11/723,706

(22) Filed: Mar. 21, 2007

(65) Prior Publication Data

US 2007/0231679 A1 Oct. 4, 2007

(30) Foreign Application Priority Data

Mar. 29, 2006 (KR) .................... 10-2006-0028659

(51) Int. Cl.
*H01M 10/00* (2006.01)
*H01M 2/16* (2006.01)

(52) U.S. Cl. ..................... 429/247; 429/122
(58) Field of Classification Search ............... 429/122, 429/247
See application file for complete search history.

(56) References Cited

U.S. PATENT DOCUMENTS 6,869,725 B2 * 3/2005 Iwanaga et al. ............. 429/130

2004/0258987 A1 12/2004 Shin

FOREIGN PATENT DOCUMENTS

| JP | 2000067847 A | * | 3/2000 |
| JP | 13-076759 | | 3/2001 |
| JP | 2001076759 A | * | 3/2001 |
| KR | 1020040110600 A | | 12/2004 |
| KR | 100770110 B1 | | 10/2007 |

OTHER PUBLICATIONS

Korean Notice of Allowance dated Sep. 6, 2010 for the corresponding Korean Patent Application No. 10-2006-0028659 and Request for Entry of the Accompanying Document herewith.

\* cited by examiner

*Primary Examiner*—Dah-Wei D Yuan
*Assistant Examiner*—Zachary Best
(74) *Attorney, Agent, or Firm*—Robert E. Bushnell, Esq.

(57) ABSTRACT

A center pin and a lithium ion secondary battery are provided. The center pin has a hollow body and a solid extinguishant is disposed inside the hollow body. The solid extinguishant has a certain shape that can fit into the hollow body, and can be made by compressing a powder extinguishing substance. Top and bottom of the center pin are initially closed by blocking members to reduce a dead volume in a battery. The top and bottom of the center pin open at high temperature so that the solid extinguishant is liquefied and flows out of the center pin. The liquefied extinguishant at the high temperature prevent the battery from igniting.

22 Claims, 7 Drawing Sheets

CENTER PIN AND LITHIUM ION SECONDARY BATTERY USING THE SAME

CLAIM OF PRIORITY

This application makes reference to, incorporates the same herein, and claims all benefits accruing under 35 U.S.C. §119 from an application for CENTER PIN AND LITHIUM RECHARGEABLE BATTERY USING THE SAME earlier filed in the Korean Intellectual Property Office on the 29 Mar. 2006 and there duly assigned Serial No. 10-2006-0028659.

BACKGROUND OF THE INVENTION

1. Field of the Invention

The present invention relates to a center pin and a lithium ion secondary battery, and more particularly, to a center pin that has a hollow body and a solid extinguishant inside the hollow body, and a lithium ion secondary battery having the same. The solid extinguishant has a certain shape and can be made by compressing a powder extinguishing substance. Top and bottom of the center pin are initially closed to reduce a dead volume in a battery. The top and bottom of the center pin open at high temperature so that the solid extinguishant is liquefied and flows out of the center pin. The liquefied extinguishant at the high temperature prevent the battery from igniting.

2. Description of the Related Art

As weights of portable apparatuses, such as video cameras, mobile telephones, and portable computers, are reduced and performance of the portable apparatuses is improved, researches have been performed on the secondary batteries that are used for the driving power sources of the portable apparatuses. The secondary batteries include a nickel cadmium (Ni—Cd) battery, a nickel metal hybrid (Ni-MH) battery, a nickel zinc (Ni—Zn) battery, and a lithium ion (Li-ion) secondary battery. The Li-ion secondary battery is rechargeable, can be made in a small size, and has large capacity. The operation voltage and the energy density per unit weight of the Li-ion secondary battery are high. Therefore, the Li-ion secondary battery is widely used for the portable apparatuses and for other types of electronic devices.

A lithium ion secondary battery includes a cylindrical can, an electrode assembly that is disposed inside the cylindrical can, an electrolyte filled in the cylindrical can, a cap assembly installed at an upper part of the cylindrical can, and a center pin that is inserted into the core of the electrode assembly. The electrode assembly has a positive electrode plate, a negative electrode plate, and a separator that is disposed between the positive electrode plate and the negative electrode plate. The electrode assembly is disposed inside the cylindrical can, and an electrolyte is filled in the cylindrical can. The electrode assembly produces electricity through chemical reaction with the electrolyte.

The cap assembly covers the open top of the cylindrical can, and has terminals to supply electricity generated in the can to an external device that is electrically connected to the can. The cap assembly includes a safety vent and a current interception unit. The safety vent is distorted or broken when gas is generated in the can increasing pressure. If the safety vent is distorted or broken, the current interception unit is also damaged, and current is intercepted.

The center pin is inserted in order to prevent the electrode assembly from being distorted or floating. The center pin is commonly formed of a metal such as stainless steel. The center pin functions as a path for supplying gas generated in the can to the cap assembly.

On the other hand, a void volume or a dead volume, which is an empty space, exists in a battery. The dead volume is formed between the cap assembly and the electrode assembly, and is also formed inside the center pin. The dead volume causes a safety problem in a battery. If a battery is overcharged, voltage of the battery and temperature of the battery increase. In this case, gas is generated inside the battery. The pressure of the gas distorts the safety vent installed in the cap assembly to intercept current and to prevent a dangerous situation. The dead volume, however, prevents the pressure of the gas from quickly increasing, and as a result, prevents the gas from quickly distorting the safety vent. Therefore, the temperature of the battery further rises to an ignition point, which causes an explosion of the battery.

Therefore, it is necessary to provide a secondary battery that effectively reduces the dead volume and that efficiently prevents the explosion of the battery during an abnormal operation of the battery.

SUMMARY OF THE INVENTION

In order to solve the above-described problems, it is an object of the present invention to provide a center pin into which a solid substance manufactured to have a fixed shape by compressing a powder extinguishant is inserted, and whose top and bottom are blocked so that the center pin is blocked at an initial stage to reduce a dead volume in a battery and to prevent the extinguishant from generating any gas. The top and bottom are opened at a high temperature so that the solid extinguishant is liquefied to flow out of the center pin at a temperature no less than a specific threshold temperature and to prevent the battery from igniting and a lithium ion secondary battery using the same.

In order to achieve the foregoing objects of the present invention, there is provided a center pin including a hollow body that has a side wall, an open top, and an open bottom, and a solid extinguishant disposed inside the hollow body. The extinguishant can be formed by compressing a powder extinguishant. The extinguishant can be formed by mixing a binder with the powder extinguishant and by compressing the mixture. The extinguishant can be spherical or cylindrical. The extinguishant is preferably liquefied at a temperature between 120° C. and 300° C. The body can be formed of steel, stainless steel, copper, or aluminum. The top and bottom of the body can be blocked by blocking members. The blocking members can be formed of a polymer resin. The extinguishant can include sodium hydrogen carbonate ($NaHCO_3$), ammonium dihydrogen phosphate ($NH_4H_2PO_4$), or sodium hydroxide (NaOH).

Also, there is provided a lithium ion secondary battery comprising an electrode assembly, a can for accommodating the electrode assembly, a cap assembly for blocking the top opening of the can, and a center pin inserted into the core of the electrode assembly. The center pin includes a hollow body, which has a side wall, an open top, and an open bottom, and a solid extinguishant inserted into the body and having a uniform shape. The extinguishant can be formed by compressing a powder extinguishant. The extinguishant can be spherical or cylindrical. The extinguishant can be liquefied at a temperature between 120° C. and 300° C. The body can be formed of steel, stainless steel, or copper. The top and bottom of the body can be blocked by blocking members. The blocking members can be formed of a polymer resin. The extinguishant can include sodium hydrogen carbonate ($NaHCO_3$), ammonium dihydrogen phosphate ($NH_4H_2PO_4$), or sodium hydroxide (NaOH).

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, preferred embodiments of the present invention will be described in detail with reference to the accompanying drawings.

First, a structure of a lithium ion secondary battery and a function of each part of the lithium ion secondary battery will be described.

Figure 1:
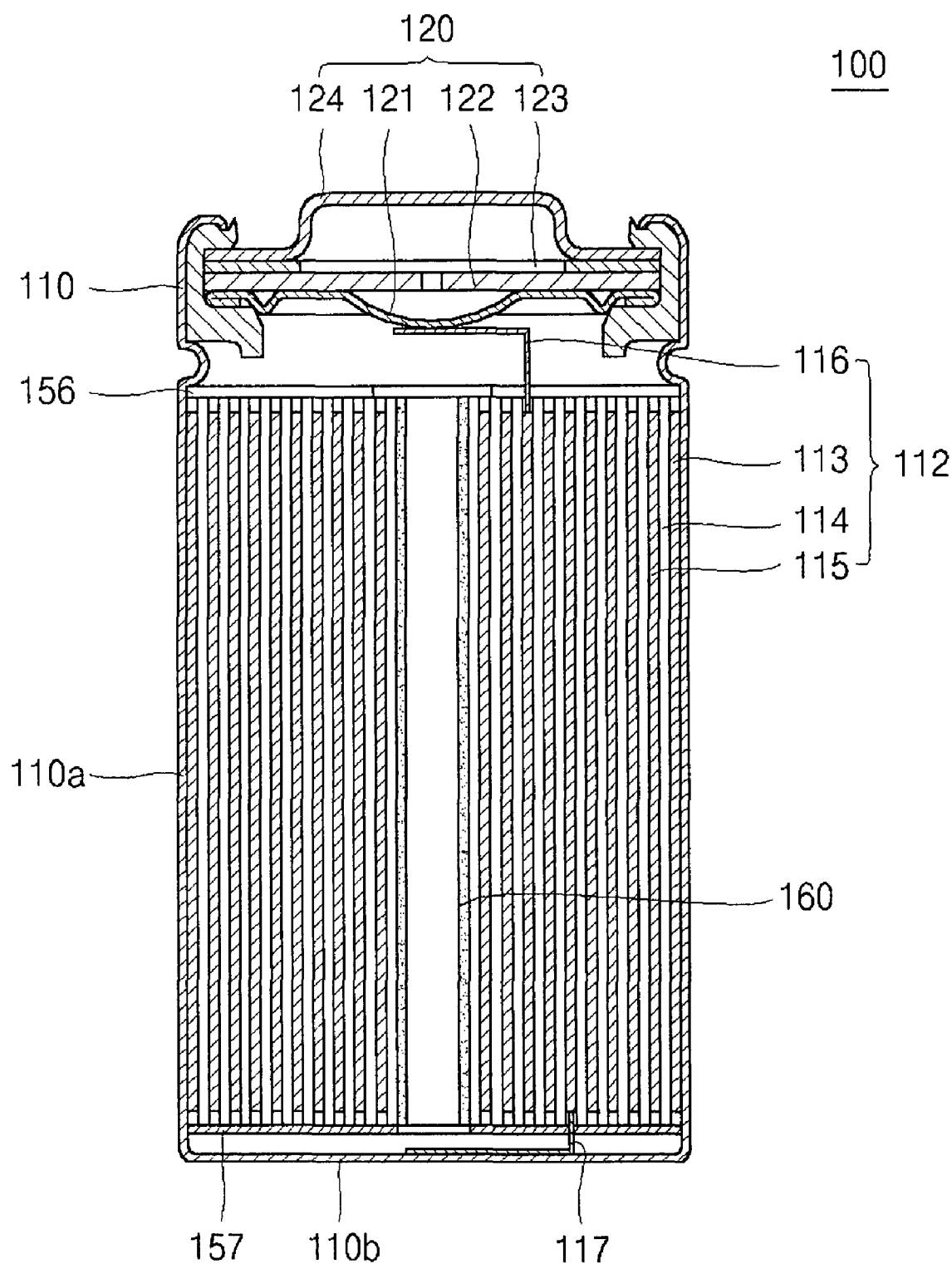
FIG. 1 is a sectional view of a lithium ion secondary battery.

FIG. 1 is a sectional view of a lithium ion secondary battery. Referring to FIG. 1, cylinder type lithium ion secondary battery 100 includes electrode assembly 112, cylinder type can 110 for accommodating the electrode assembly 112, and cap assembly 120 installed at an upper part of cylinder type can 110. An electrolyte is filled inside the can 110. Cap assembly 120 closes an open top of the can 110, and has terminals to supply electricity to an external apparatus. Cylinder type center pin 160 is inserted into the core of electrode assembly 112.

Electrode assembly 112 includes positive electrode plate 113 having a positive electrode collector that is coated with a positive electrode active material, negative electrode plate 115 having a negative electrode collector that is coated with a negative electrode active material, and separator 114 positioned between positive electrode plate 113 and negative electrode plate 115 to electrically insulate positive electrode plate 113 from negative electrode plate 115. The stack of positive electrode plate 113, separator 114, and negative electrode plate 115 is wounded to form a shape of a jelly-roll.

Although not shown in the drawing, positive electrode plate 113 can include a positive electrode collector, a positive electrode active material layer, and a positive electrode non-coating portion. A positive electrode collector is formed of a thin plate of metal having excellent conductivity such as an aluminum (Al) foil. The positive electrode active material layer is formed at the both surfaces of the positive electrode collector. The positive electrode active material layer is not formed on the positive electrode non-coating portion. The positive electrode non-coating portion can be formed on both ends of positive electrode plate 113. Positive electrode tab 116, which is formed of aluminum (Al), protrudes above electrode assembly 112. One end of positive electrode tab 116 is connected to an end of the positive electrode non-coating portion.

Negative electrode plate 115 can include a negative electrode collector, a negative electrode active material layer, and a negative electrode non-coating portion. The negative electrode collector is formed of a conductive thin plate such as a copper (Cu) or nickel (Ni) foil. The negative electrode active material layer is formed on both surfaces of the negative electrode collector. The negative electrode active material layer is not formed on the negative electrode non-coating portion. The negative electrode non-coating portion can be formed on both ends of negative electrode plate 115. Negative electrode tab 117, which is formed of nickel (Ni), protrudes below electrode assembly 112. One end of negative electrode tab 117 is connected to an end of the negative electrode non-coating portion.

Insulation plates 156 and 157 are provided at the top and bottom of electrode assembly 112, respectively, to prevent electrode assembly 112 from contacting cap assembly 120.

Cylinder type can 110 includes cylinder type side plate 110a and bottom plate 110b. Side plate 110a has a predetermined diameter, so that a predetermined space is formed inside can 110 and electrode assembly 112 is accommodated in can 110. Bottom plate 110b is disposed at the lower part of side plate 110a to block the bottom of can 110. Can 110 has an open top so that electrode assembly 112 can be inserted inside can 110. Negative electrode tab 117 can be connected to bottom plate 110b of cylinder type case 110 so that cylinder type can 110 can be a negative electrode terminal. Cylinder type can 110 can be made of nickel (Ni), iron (Fe), or an alloy of the above metals.

Furthermore, cylinder type can 110 has a crimping unit on the upper part of side plate 110a. The crimping unit is bent inwards to hold the upper part of cap assembly 120 that is coupled with the top opening of can 110. Side plate 110a of can 110 has a beading unit that is recessed inwards to hold the lower part of cap assembly 120. The beading unit is formed at a position separated from the crimping unit by a distance that is almost the same as the thickness of cap assembly 120.

Cap assembly 120 can include safety vent 121, current interception unit 122, secondary protective element 123, and cap-up 124. A protrusion that protrudes downward can be formed in the center of safety vent 121. The protrusion is positioned in the lower part of cap assembly 120, and can be distorted upward by pressure of gas generated in the secondary battery. Positive electrode tab 116, which is connected to positive electrode plate 113 is welded to a predetermined position of the bottom of safety vent 121 so that safety vent 121 and positive electrode plate 113 of electrode assembly 112 can be electrically connected to each other. Negative electrode plate 115 is electrically connected to can 110 by negative electrode tab 117. Safety vent 121 is distorted or broken when pressure of gas generated in can 110 increases, and damages current interception unit 122, which is positioned on the top of safety vent 121. Secondary protective element 123, which intercepts current when over-current flows, is positioned on the top of current interception unit 122. Furthermore, conductive cap-up 124 for providing voltage of positive polarity to an external device is further positioned on secondary protective element 123.

Figure 2A:
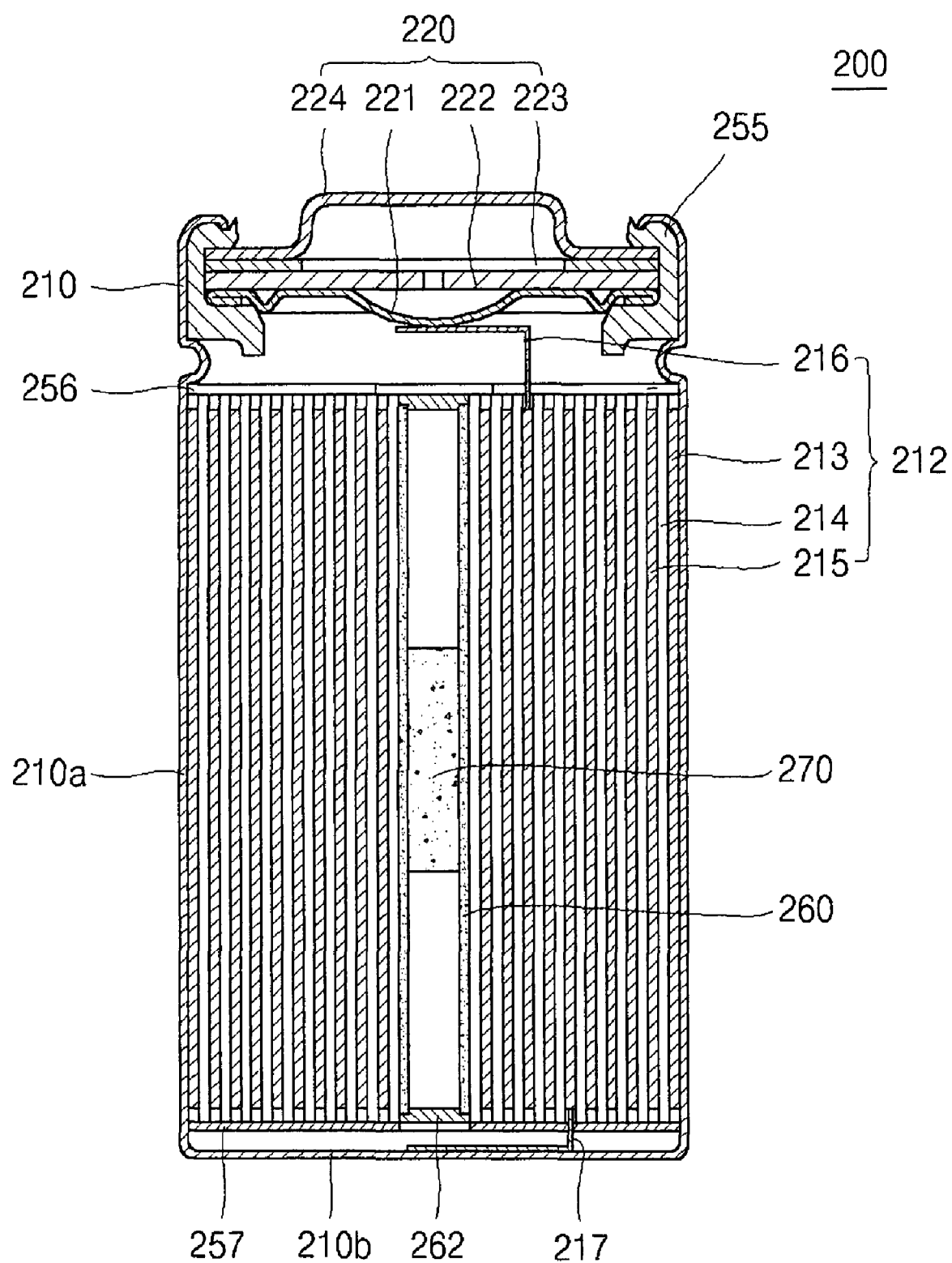
FIG. 2A is a sectional view of a lithium ion secondary battery constructed as an embodiment of the present invention.
Figure 2B:
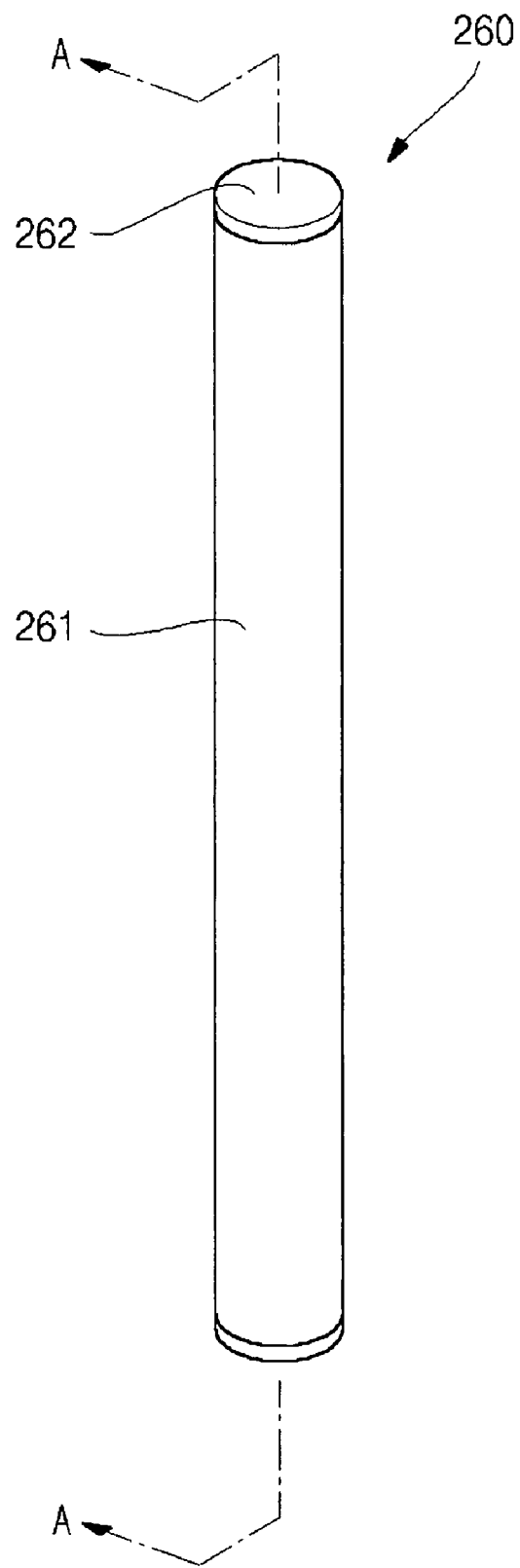
FIG. 2B is a perspective view of a center pin constructed as an embodiment of the present invention.
Figure 2C:
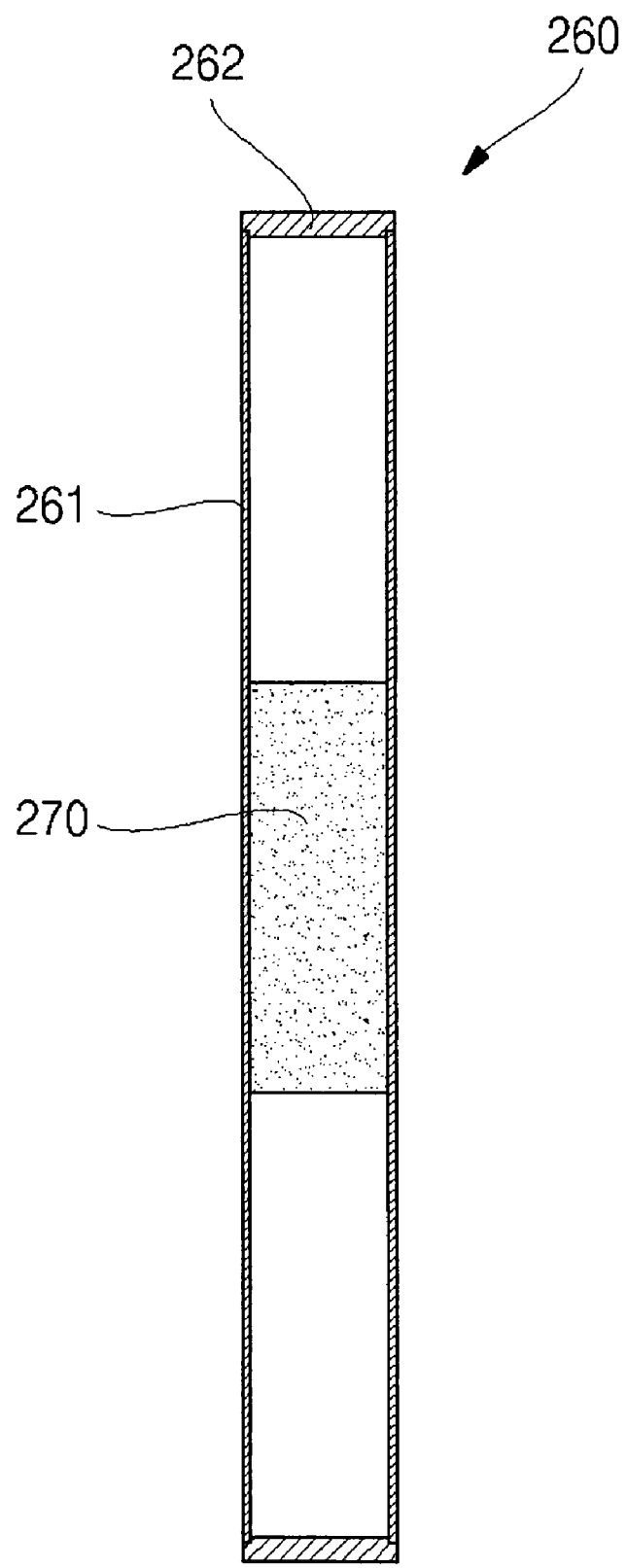
FIG. 2C is a sectional view taken along the line A-A of FIG. 2B.

Hereafter, a lithium ion secondary battery constructed as an embodiment of the present invention will be described. FIG. 2A is a sectional view of a lithium ion secondary battery constructed as an embodiment of the present invention. FIG. 2B is a perspective view of a center pin constructed as an embodiment of the present invention. FIG. 2C is a sectional view taken along the line A-A of FIG. 2B.

Referring to FIG. 2A, lithium ion secondary battery 200 of the present invention includes electrode assembly 212, can 210, cap assembly 220, and center pin 260. Lithium ion secondary battery 200 can be formed in a shape of a cylinder.

Electrode assembly 212 can include positive electrode plate 213, negative electrode plate 215, and separator 214. Electrode assembly 212 also can include positive electrode tab 216 and negative electrode tab 217.

Positive electrode plate 213 includes a positive electrode collector, a positive electrode active material layer, and a positive electrode non-coating portion. The positive electrode collector can be formed of a conductive metal to flow current from the positive electrode active material layer to an external circuit. The positive electrode active material layer is manufactured by mixing a positive electrode active material with a conductive material and a binder. The positive electrode collector is coated with the mixture of the positive electrode active material to a predetermined thickness. The positive electrode non-coating portion is a part of positive electrode plate 213 in which the positive electrode active material layer is not formed. Positive electrode tab 216 can be welded to one end of the positive electrode non-coating portion.

Negative electrode plate 215 includes a negative electrode collector, a negative electrode active material layer, and a negative electrode non-coating portion. The negative electrode collector can be formed of a conductive metal to collect electrons from the negative electrode active material layer and to move the collected electrons to the external circuit. The negative electrode active material layer is manufactured by mixing a negative electrode active material with a conductive material and a binder. The negative electrode collector can be coated with the mixture of the negative electrode active material to a predetermined thickness. The negative electrode non-coating portion is a part of negative electrode plate 215 in which the negative electrode active material layer is not formed. Negative electrode tab 217 can be welded to one end of the negative electrode non-coating portion.

Positive electrode tab 216 and negative electrode tab 217 are welded to the positive electrode non-coating portion and the negative electrode non-coating portion, respectively, to electrically connect electrode assembly 212 to the other parts of the battery. Positive electrode tab 216 and negative electrode tab 217 can be welded by resistance welding, and lamination tapes can be attached to the welded parts in order to prevent electrical short and generation of heat. The welding method of positive electrode tab 216 and negative electrode tab 217 is not limited.

Separator 214 is interposed between positive electrode plate 213 and negative electrode plate 215, and can be extended to wrap the outer circumference of electrode assembly 212. Separator 214 prevents positive electrode plate 213 from contacting negative electrode plate 215, and can be formed of a porous polymer material so as to transfer lithium ions.

Can 210 includes side plate 210a and lower plate 210b. Can 210 can have a shape of a cylinder. Side plate 210a includes an outer circumference and an inner circumference that are concentric circles. Lower plate 210b includes a front surface and a rear surface that are parallel with each other. The top of can 210 is open to form a top opening so that electrode assembly 212 can be inserted, and an electrolyte can be injected through the top opening. Lower insulation plate 257 can be inserted between lower plate 210b of can 210 and electrode assembly 212 in order to insulate can 210 from electrode assembly 212. In the upper part of can 210, a beading part can be formed in order to prevent electrode assembly 212 from floating in can 210 and to receive cap assembly 220 after electrode assembly 212 is inserted. A crimping part can be formed on the upper part of side plate 210a to completely package the battery after cap assembly 220 is installed. Upper insulation plate 256 can be inserted between the top of electrode assembly 212 and cap assembly 220 in order to insulate electrode assembly 212 from cap assembly 220. Can 210 can be made of a material, which is light and soft, such as steel, stainless steel, copper, aluminum, or an alloy of the above metals. However, the material of can 210 is not limited to the above. Can 210 is preferably manufactured by a deep drawing method. However, the manufacturing method of can 210 is not limited to the above.

Cap assembly 220 includes safety vent 221 that can be distorted by pressured of gas generated in the battery, current interception unit 222 that can be broken by the distortion of safety vent 221 to intercept current, secondary protective element 223 whose electric conductivity is rapidly reduced by the increase of temperature, and cap-up 224 that covers the top of the battery and functions as a positive electrode terminal. Cap assembly 220 further includes gasket 255 to insulate cap assembly 220 that functions as a positive electrode terminal from can 210 that functions as a negative electrode terminal. Center pin 260 includes extinguishant 270 and blocking members 262 that are disposed at the top and bottom of center pin 260.

Referring to FIGS. 2B and 2C, center pin 260 includes hollow body 261 and extinguishant 270 disposed inside body 261. Center pin 260 can be formed in a shape of a hollow cylinder. Body 261 of center pin 260 has a side wall, an open top, and an open bottom. Center pin 260 can further include blocking members 262. Center pin 260 is inserted into the core of the wound electrode assembly 212. The center pin 260 can be formed to have substantially the same height as the height of electrode assembly 212. Center pin 260 can be inserted into the core of electrode assembly 212 after wound electrode assembly 212 is inserted into can 210, or can be first inserted into wound electrode assembly 212 and then can be inserted into can 210 together with the electrode assembly 212.

Body 261 is a frame of center pin 260 that has a hollow cylindrical shape with a predetermined length (or height). Because body 261 should have strength enough to prevent electrode assembly 212 from being distorted, body 261 is preferably made of steel, stainless steel, copper (Cu), aluminum (Al), or an equivalent. The stainless steel, which is corrosion proof steel, includes ferrite stainless steel based on iron-chrome and austenite stainless steel based on iron-nickel-chrome. The ferrite stainless steel contains chrome (Cr), and has a body-centered cubic crystal (BCC) structure at a room temperature. Both oxide layers of the iron and the chrome are created on the surface of the ferrite stainless steel, when the ferrite stainless steel is oxidized, to protect the inside of the ferrite stainless steel. The ferrite stainless steel is ferromagnetic. The austenite stainless steel is obtained by adding a large amount of nickel (Ni) and chrome (Cr) to a face-centered cubic crystal (FCC) structure, which is a crystal structure of iron at a temperature between 900° C. and 1,400° C., and by being stabilized at room temperature. The austenite stainless steel is paramagnetic. Body 261 is formed to have a height that is substantially the same as the height of electrode assembly 212, and to have an external diameter that can fit into the core of electrode assembly 212.

Blocking members 262 are in a form of lids that block the open top and open bottom of body 261, respectively. A stair shape recess is formed in the part of blocking members 262 where each of the blocking members 262 is coupled with body 261. Blocking members 262 can tightly fit into body 261 through the stair shape recess. In the blocking members 262, cylinders having different diameters are stacked to form a stair. The cylinder having a smaller diameter is formed to fit into the internal diameter of body 261.

The thicknesses (or heights) of blocking members 262 are determined to satisfy the requirement that the blocking members 262 can be melted at a predetermined temperature and also can sufficiently block the open top and bottom of body 261. Blocking members 262 are formed to remove a dead volume that exist inside center pin 260. Therefore, if temperature in the battery is relatively low, blocking members 262 block the open top and bottom of center pin 260 so that gas generated in the battery can rapidly expand to distort safety vent 221. When the temperature in the battery is relatively high, blocking members 262 must be melted or broken at the temperature to prevent the battery from exploding or igniting. Therefore, blocking members 262 are preferably formed of a polymer resin, which can be melted at a predetermined temperature, such as polyethylene (PE), polypropylene (PP), or polyethyleneterephthalate (PET). The polyethylene (PE) has low density and loose arrangement of molecules, and the polyethylene (PE) is soft and easily processed. Also, since the polyethylene (PE) is formed of only $CH_2$, electrical insulation property is excellent. Since the polyethylene (PE) is symmetrical based on the chain of carbons (C), the polyethylene (PE) is suitable for a high frequency insulation material. The melting point of the polyethylene (PE) varies slightly depending on types, but is mostly between 107° C. and 112° C. The polypropylene (PP) has an isotactic structure, and a methyl group is arranged in the same direction. The melting point of the polypropylene (PP) is about 165° C. The polyethyleneterephthalate (PET) is saturation polyester obtained by polycondensating terephthalic acid and ethylene glycol, and has excellent heat resistance.

If extinguishant 270 occupies the largest inside part of body 261, blocking members 262 may not be formed. Because the melting temperature of blocking members 262 is equal to or lower than the melting temperature of extinguishant 270, extinguishant 270 is formed to occupy the largest inside part of body 261 so that extinguishant 270 can also function as a blocking member.

Blocking members 262 are melted or broken when the temperature in the battery is about between 80° C. and 200° C. so that the top and bottom of body 261, which are blocked by blocking members 262, are open. Thus, extinguishant 270 disposed inside body 261 is melted, and melted extinguishant 270 flows out of center pin 260 to prevent the battery from igniting. Therefore, at normal operation condition, the top and bottom of center pin 260 are closed to significantly reduce a void volume, which helps gas generated in the battery quickly to increase pressure and helps safety vent 221 rapidly to operate in an emergency situation. If the temperature in the battery increases, because the battery can explode or ignite, blocked center pin 260 is useless and would rather be used as a chimney. That is, a gas formed by decomposing cyclohexyl benzene (CHB) and biphenyl (BP) included in the electrolyte is preferably exhausted upward along hollow body 261 of center pin 260 to prevent the battery from exploding.

Extinguishant 270 is formed to have a cylindrical shape by compressing a powder form of extinguishant substance. Extinguishant 270 is formed to have a shape that matches the internal diameter of body 261 and a predetermined height of body 261 as illustrated in FIG. 2C. Extinguishant 270 also can be formed to have a smaller size than the internal diameter of body 261 so that extinguishant 270 is positioned on the bottom of body 261, that is, on bottom blocking member 262. Extinguishant 270 is formed to have a volume by which it is possible to prevent the battery from igniting when the temperature in the battery is high so that the battery can ignite and can be formed to have a volume that occupies the largest part of body 261 as described above. Extinguishant 270 can include sodium hydrogen carbonate ($NaHCO_3$), ammonium dihydrogen phosphate ($NH_4H_2PO_4$), or sodium hydroxide (NaOH). The sodium hydrogen carbonate ($NaHCO_3$) is colorless crystalline powder, and generates carbon dioxide ($CO_2$) and water ($H_2O$), and changes into sodium carbonate anhydride ($Na_2CO_3$) when heated. The ammonium dihydrogen phosphate ($NH_4H_2PO_4$) cools combustibles by a heat absorbing operation during pyrolysis and the hygroscopic phosphate is generated to cover the combustibles. Since the sodium hydroxide (NaOH) is pyrolyzed to create the carbon dioxide ($CO_2$) and the water ($H_2O$), the sodium hydroxide (NaOH) intercepts oxygen. Since the sodium hydroxide (NaOH) is used in the form of powder, it is used as the powder extinguishant.

The extinguishant 270 is formed to be a cylindrical solid substance by compressing the powder extinguishant and to be liquefied at temperature between 120° C. and 300° C. Extinguishant 270 may not be easily compressed into a solid substance having a fixed shape only by strong pressure. In this case, extinguishant 270 can be compressed by mixing a binder with the powder extinguishing substance. The binder has the powders adhere to each other so that the powders can be easily compressed into the solid substance having a fixed shape. A polymer material can be used as the binder. Extinguishant 270 is in the state of the solid having the fixed shape without generating any gas below a specific temperature, and then, is melted into a liquid to prevent the battery from igniting the moment at which or after blocking members 262 are melted at a specific temperature. Since an extinguishing reaction corresponds to a heat absorbing reaction, extinguishant 270 absorbs peripheral heat in an extinguishing process to reduce the temperature in the battery.

A lithium ion secondary battery according to another embodiment of the present invention will be described.

Figure 3:
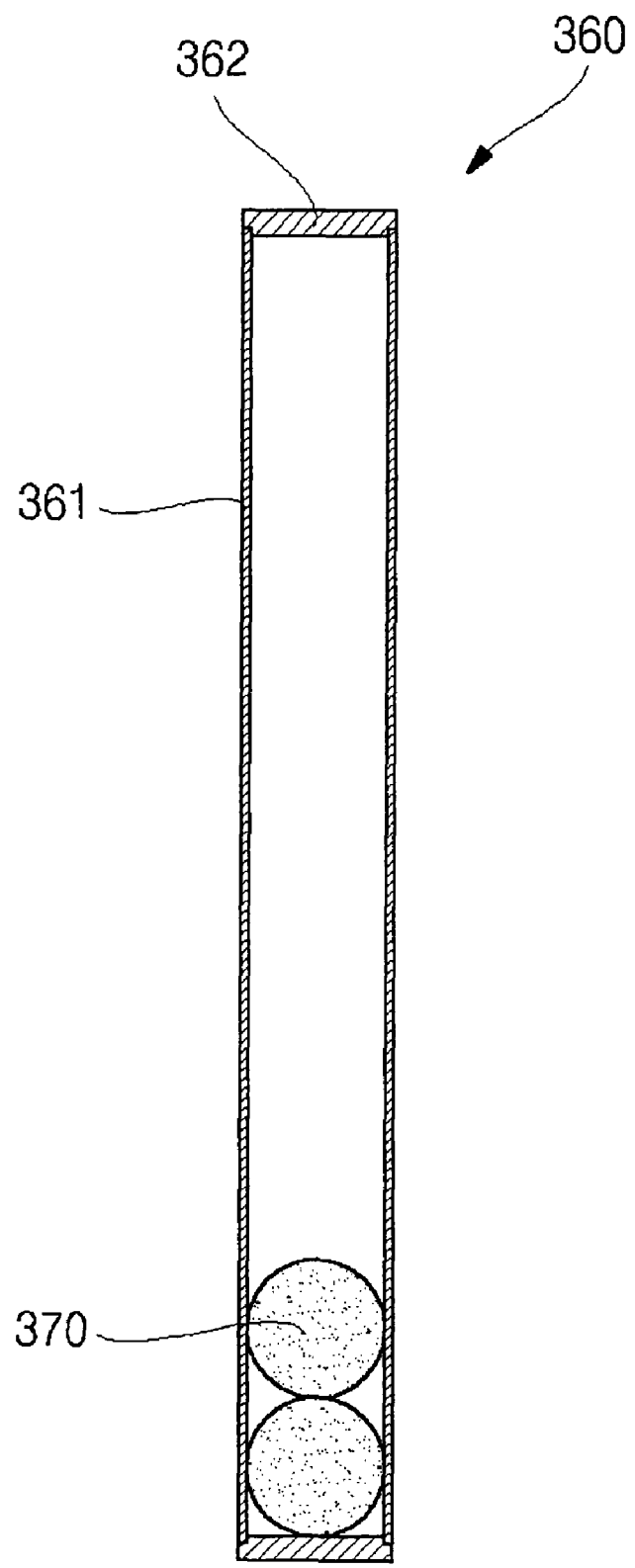
FIG. 3 is a sectional view of a center pin constructed as another embodiment of the present invention.

FIG. 3 is a sectional view of a center pin constructed as another embodiment of the present invention. Since the center pin of the embodiment of FIG. 3 is similar to the center pin of the embodiment of FIG. 2C except that the extinguishant is formed to be spherical, difference between the center pin of the embodiment of FIG. 2C and the center pin of the embodiment of FIG. 3 will be mainly described.

The lithium ion secondary battery of another embodiment of the present invention includes an electrode assembly, a can, a cap assembly, and center pin 360. Since the electrode assembly, the can, and the cap assembly were sufficiently described with reference to the embodiment of FIG. 2A, detailed description thereof will be omitted.

Referring to FIG. 3, center pin 360 includes hollow body 361, blocking members 362, and extinguishants 370. Body 361 is formed to have a form of a hollow cylinder so that the top and bottom thereof are opened. Body 361 is formed of a metal having predetermined strength such as steel, stainless steel, copper, and aluminum. However, the material of body 361 is not limited to the above. Blocking members 362 are in the form of lids that block the open top and the open bottom of body 361, and are formed of a polymer resin that can be broken or melted at a predetermined temperature, in particular, the polyethylene (PE). Extinguishants 370 are positioned inside body 361, and are formed to be spherical by compressing a powder extinguishant. Extinguishants 370 can be formed to have a size fitting into the internal diameter of body 361, and can be formed to be smaller than the internal diameter of body 361. As illustrated in FIG. 3, the two extinguishants 370 can be inserted and more or less extinguishants can be inserted depending on the design of the battery. The number of extinguishants 370 is not limited. If necessary, a binder formed of a polymer material can be mixed with the powder extinguishing substance, and the mixture is compressed to obtain extinguishants 370. The powder extinguishing substance can include sodium hydrogen carbonate ($NaHCO_3$), ammonium dihydrogen phosphate ($NH_4H_2PO_4$), or sodium hydroxide (NaOH). Extinguishants 370 are formed to be liquefied at temperature between 120° C. and 300° C. Since extinguishants 370 are formed to be spherical, extinguishants 370 can be easily inserted into center pin 360, and the number of extinguishants 370 can be easily controlled in accordance with the design of the battery.

Figure 4A:
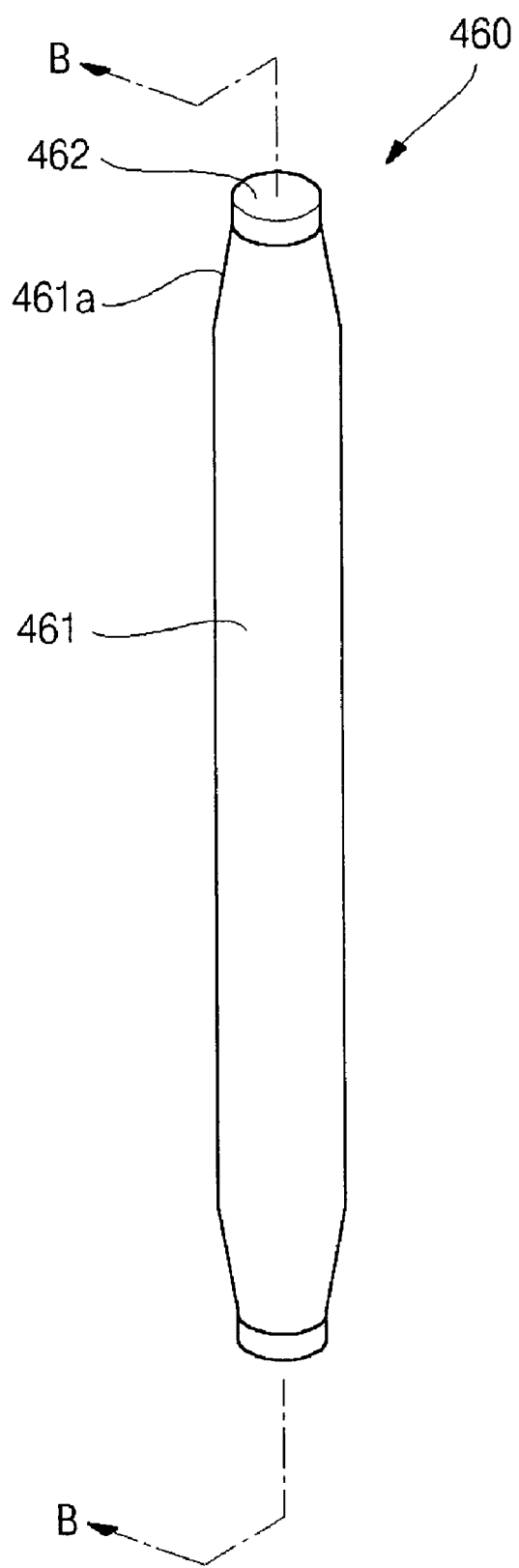
FIG. 4A is a perspective view of a center pin constructed as still another embodiment of the present invention.
Figure 4B:
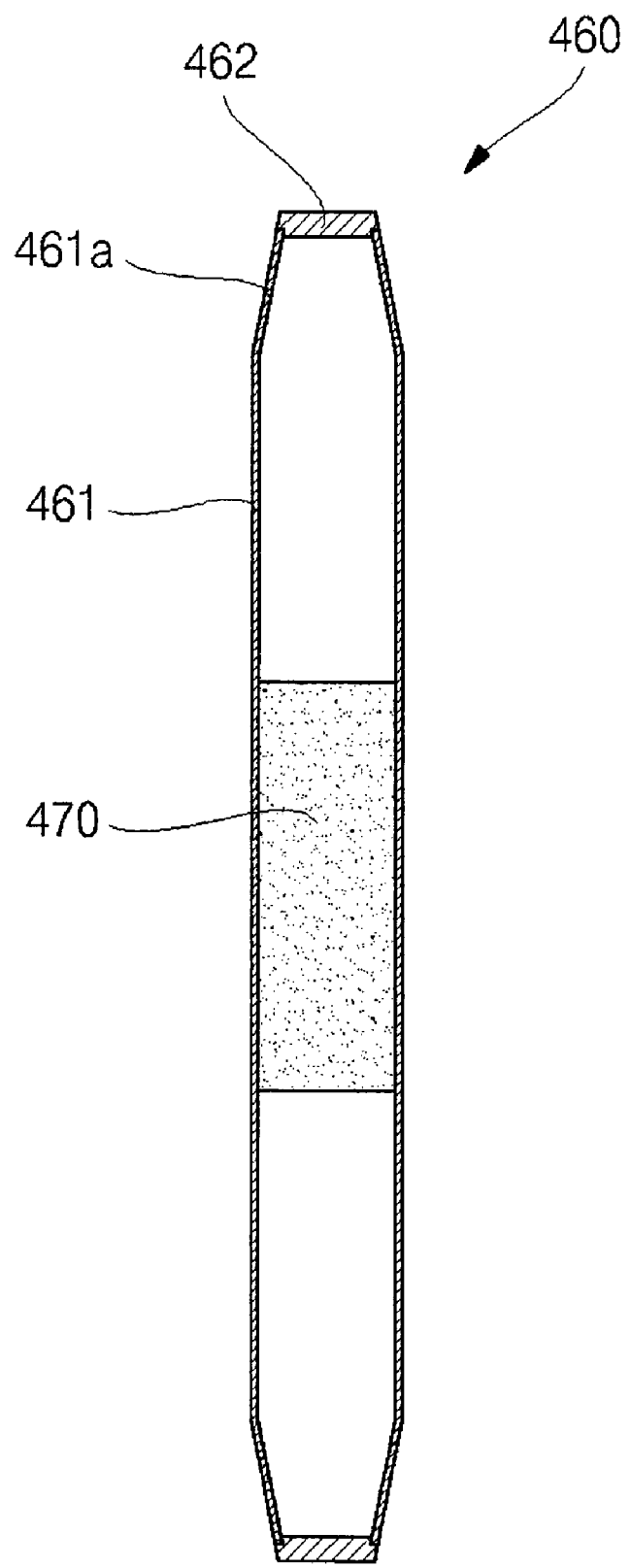
FIG. 4B is a sectional view taken along the line B-B of FIG. 4A.

A lithium ion secondary battery constructed as still another embodiment of the present invention will be described. FIG. 4A is a perspective view of a center pin of still another embodiment of the present invention. FIG. 4B is a sectional view taken along the line B-B of FIG. 4A. Since the embodiment of FIG. 4B is similar to the embodiment of FIG. 2C except that tapers are formed in the upper and lower parts of the body, a difference between the embodiment of FIG. 2C and the embodiment of FIG. 4B will be mainly described. According to the embodiment of FIG. 4B, a cylindrical extinguishant can be inserted like the embodiment of FIG. 2C or spherical extinguishants can be inserted like the embodiment of FIG. 3. That is, the embodiment of FIG. 2C and the embodiment of FIG. 3 can be selectively applied to the embodiment of FIG. 4B.

A lithium ion secondary battery of still another embodiment of the present invention includes an electrode assembly, a can, a cap assembly, and center pin 460. Since the electrode assembly, the can, and the cap assembly were sufficiently described with reference to the embodiment of FIG. 2A, detailed description thereof will be omitted.

Referring to FIGS. 4A and 4B, center pin 460 includes body 461 and extinguishant 470. Also, center pin 460 can further include blocking members 462. The top and bottom of body 461 are open. The center of body 461 is formed to be cylindrical. Tapers 461a are formed in the upper and lower parts of body 461. The external diameter and the internal diameter of tapers 461a are smaller than those of the center part of body 461, and are gradually reduced as approaching the upper and lower parts of body 461 from the central part of body 461. Since the upper and lower parts of center pin 460 can be easily distorted in comparison with the middle part of center pin 460 when center pin 460 is distorted by external shock, tapers 461a are formed in the upper and lower parts of body 461 so that the diameter of the upper and lower parts is smaller than the diameter of the center in order to minimize the distortion. Tapers 461a can be linearly reduced to have a predetermined slope and can be curved so that the degree of reduction increases from the center toward the ends. The shape of tapers 461a is not limited. Blocking members 462 are in the form of lids that block the top and bottom of body 461, and are formed of a polymer resin that can be broken or melted at a predetermined temperature. Extinguishant 470 is formed to be cylindrical or spherical by compressing the powder extinguishing substance. When extinguishant 470 is formed to be cylindrical, blocking members 462 may not be formed as described above. If necessary, a binder formed of a polymer material can be mixed with the powder extinguishing substance, and the mixture is compressed to obtain extinguishant 470. Extinguishant 470 is formed to be liquefied at temperature between 120° C. and 300° C.

Operation of a center pin of a lithium ion secondary battery of the embodiment of the present invention will be described. Hereinafter, operation of the center pin of the embodiment shown in FIG. 2C will be described. The operation principles of the center pins of embodiments shown in FIGS. 3 and 4B are the same.

Referring to FIG. 2C, center pin 260 includes body 261, blocking members 262, and extinguishant 270. When the voltage of the battery increases by the overcharge or when the temperature in the battery increases above allowed temperature, a gas is generated in the battery. The battery is filled with the gas and, when the battery is completely filled with the gas, the gas presses the battery. In particular, since safety vent 221 is formed to be very thin, it is very sensitive to the pressure in the battery. Therefore, by the pressure applied to the battery, safety vent 221 is distorted and broken, and damages current interception unit 222 positioned on the top of safety vent 221. At this time, since the top and bottom of center pin 260 are blocked by blocking members 262 reducing the dead volume, safety vent 221 rapidly operates even by lower gas pressure, and the voltage and temperature are prevented from increasing. On the other hand, if safety vent 221 does not normally operate or the temperature in the battery continuously increases even after safety vent 221 operates, the battery can ignite or explode. At this time, blocking members 262 of center pin 260 are melted, and the top and bottom of center pin 260 are open. The gas filled in the battery is discharged through hollow body 261 that is now open to the gas, and exploding of the battery can be prevented. Extinguishant 270 in center pin 260 is also melted, and flows out of center pin 260 to prevent the battery from igniting. On the other hand, since extinguishant 270 remains in a solid having a fixed shape before extinguishant 270 is melted, extinguishant 270 does not generate any gas, and extinguishant 270 does not apply any force to blocking members 262. Therefore, blocking members 262 are not distorted or damaged at an early stage.

Although a few embodiments of the present invention have been shown and described, it would be appreciated by those skilled in the art that changes might be made in this embodiment without departing from the principles and spirit of the invention, the scope of which is defined in the claims and their equivalents.

In the lithium ion secondary battery according to the present invention, the solid substance manufactured to have the fixed shape by compressing the powder extinguishant is inserted into the center pin, the top and bottom of the center pin are blocked so that the center pin is blocked at an initial stage to reduce the dead volume in the battery and to prevent the extinguishant from generating any gas, and the top and bottom of the center pin are opened at a high temperature so that the solid extinguishant is liquefied at a temperature no less than a specific threshold temperature to flow out of the center pin and to prevent the battery from igniting.

What is claimed is:

1. A center pin of a battery comprising:
   a hollow body having a side wall, an open top, and an open bottom; and
   a solid extinguishant disposed inside the hollow body.

2. The center pin as claimed in claim 1, comprised of the extinguishant having a form of compressed power.

3. The center pin as claimed in claim 2, comprised of the extinguishant including a binder and a powder extinguishing substance.

4. The center pin as claimed in claim 1, comprised of the extinguishant having a shape of a sphere or a cylinder.

5. The center pin as claimed in claim 2, comprised of the extinguishant having a shape of a sphere or a cylinder.

6. The center pin as claimed in claim 1, comprised of the extinguishant being liquefied at temperature between 120° C. and 300° C.

7. The center pin as claimed in claim 2, comprised of the extinguishant being liquefied at temperature between 120° C. and 300° C.

8. The center pin as claimed in claim 1, comprised of the hollow body being made of a material selected from the group consisting of steel, stainless steel, copper, and aluminum.

9. The center pin as claimed in claim 1, further comprising:
blocking members for blocking the open top and the open bottom of the hollow body.

10. The center pin as claimed in claim 9, wherein the blocking members are made of a polymer resin.

11. The center pin as claimed in claim 1, comprised of the extinguishant including a material selected from the group consisting of sodium hydrogen carbonate ($NaHCO_3$), ammonium dihydrogen phosphate ($NH_4H_2PO_4$), and sodium hydroxide (NaOH).

12. A lithium ion secondary battery comprising:
a can having an open top;
an electrode assembly disposed inside the can, the electrode assembly producing electricity;
a cap assembly for blocking the open top of the can; and
a center pin disposed at a core of the electrode assembly, the center pin comprising:
a hollow body having a side wall, an open top, and an open bottom; and
a solid extinguishant disposed inside the hollow body.

13. The lithium ion secondary battery as claimed in claim 12, comprised of the extinguishant having a form of compressed power.

14. The lithium ion secondary battery as claimed in claim 13, comprised of the extinguishant including a binder and a powder extinguishing substance.

15. The lithium ion secondary battery as claimed in claim 12, comprised of the extinguishant having a shape of a sphere or a cylinder.

16. The lithium ion secondary battery as claimed in claim 13, comprised of the extinguishant having a shape of a sphere or a cylinder.

17. The lithium ion secondary battery as claimed in claim 12, comprised of the extinguishant being liquefied at temperature between 120° C. and 300° C.

18. The lithium ion secondary battery as claimed in claim 13, comprised of the extinguishant being liquefied at temperature between 120° C. and 300° C.

19. The lithium ion secondary battery as claimed in claim 12, comprised of the hollow body being made of a material selected from the group consisting of steel, stainless steel, copper, and aluminum.

20. The lithium ion secondary battery as claimed in claim 12, comprised of the center pin further comprising:
blocking members for blocking the open top and the open bottom of the hollow body.

21. The lithium ion secondary battery as claimed in claim 20, wherein the blocking members are made of a polymer resin.

22. The lithium ion secondary battery as claimed in claim 12, comprised of the extinguishant including a material selected from the group consisting of sodium hydrogen carbonate ($NaHCO_3$), ammonium dihydrogen phosphate ($NH_4H_2PO_4$), and sodium hydroxide (NaOH).

* * * * *